Figure 1:
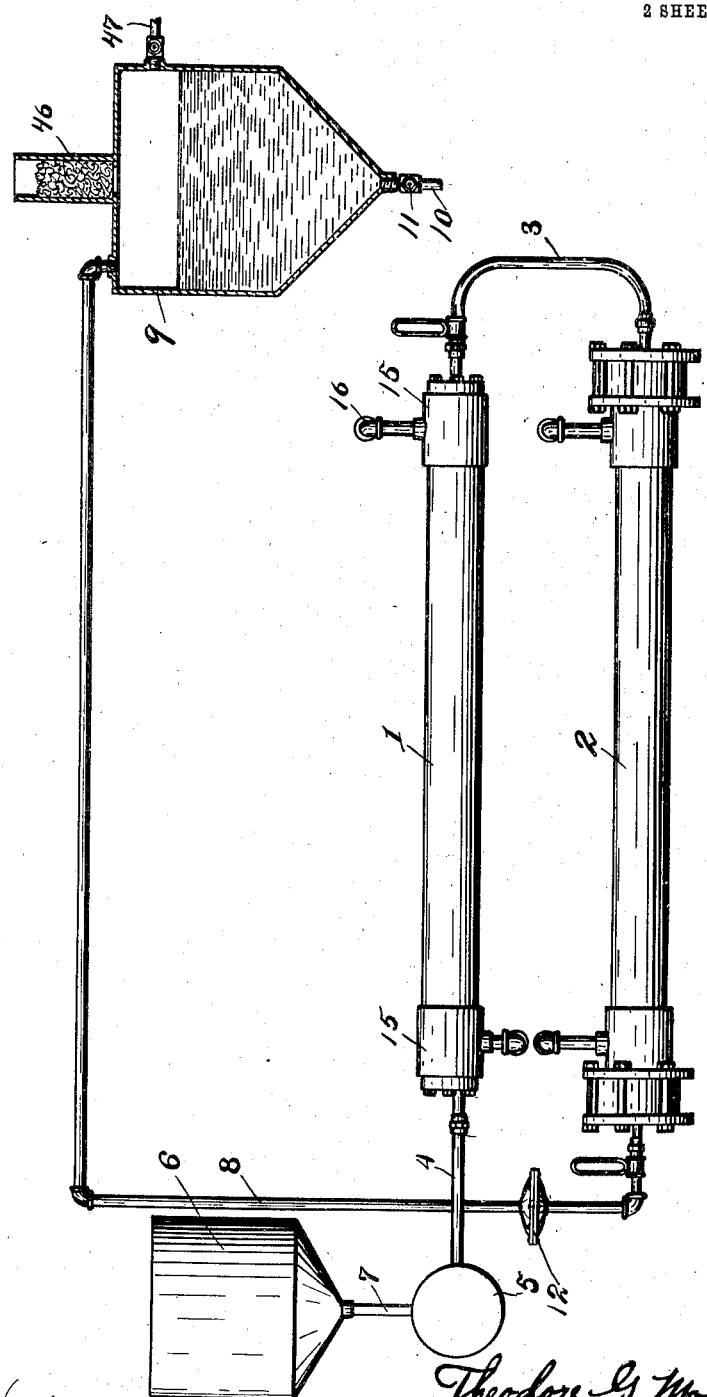

T. G. MOLLINGER.
PROCESS FOR TREATING MILK.
APPLICATION FILED SEPT. 22, 1910.

1,005,275.

Patented Oct. 10, 1911.
2 SHEETS—SHEET 1.

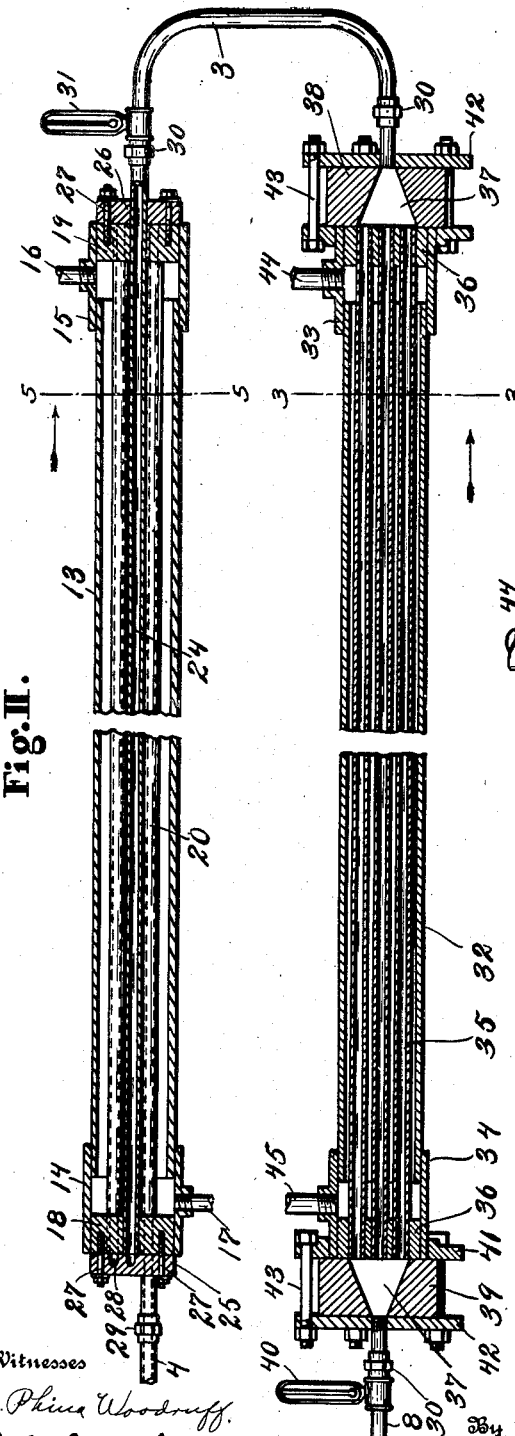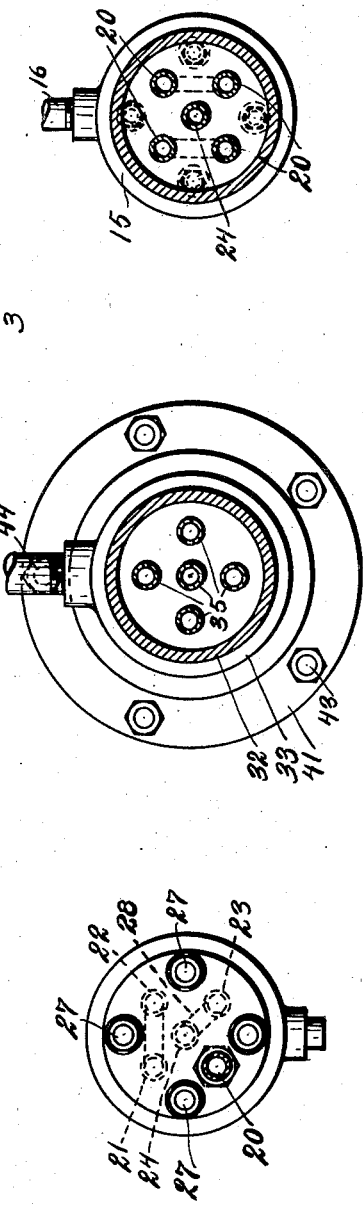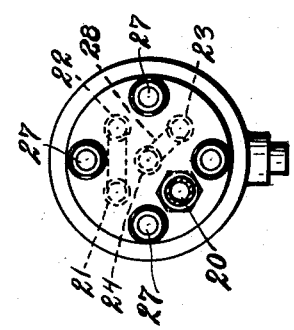

UNITED STATES PATENT OFFICE.

THEODORE G. MOLLINGER, OF KALAMAZOO, MICHIGAN, ASSIGNOR TO STEPHEN B. MONROE, TRUSTEE, OF KALAMAZOO, MICHIGAN.

PROCESS FOR TREATING MILK.

1,005,275.  Specification of Letters Patent. Patented Oct. 10, 1911.

Application filed September 22, 1910. Serial No. 583,270.

*To all whom it may concern:*

Be it known that I, THEODORE G. MOLLINGER, a subject of the Queen of the Netherlands, and now residing at Kalamazoo, Michigan, have invented certain new and useful Improvements in Processes for Treating Milk, of which the following is a specification.

In the accompanying drawings, I illustrate an apparatus such as I prefer to use in carrying out my improved process, the various parts thereof being shown mainly in conventional form, and without particular regard to scale or proportions.

Figure 1 is a side elevation of an apparatus for carrying out my improved process, certain of the parts being shown in conventional form, they being illustrated merely for the purpose of illustrating the general arrangement of the apparatus and the connections for the various parts thereof. Fig. 2 is a vertical longitudinal section through the heating and cooling elements, the connections being shown in full lines. Fig. 3 is an enlarged transverse section through the cooling element, taken on a line corresponding to line 3—3 of Fig. 2. Fig. 4 is an end view of the heating element, looking from the left of Fig. 2. Fig. 5 is a transverse section through the heating element, taken on a line corresponding to line 5—5 of Fig. 2.

In the drawings, similar reference characters refer to similar parts throughout the several views, and the sectional views are taken looking in the direction of the little arrows at the ends of the section lines.

The essential principle of my process resides in the exposure of the milk to a relatively high temperature within definite limits and considerably in excess of the boiling point of milk, such exposure being so controlled as to be practically momentary and the milk being under substantial pressure. This step is immediately followed by the very rapid cooling of the milk, down to a point closely approximating, but not higher than, the boiling point. This is again followed by a more protracted, but still definitely limited, period of cooling down to a temperature in excess of normal, after which the milk is allowed to cool throughout the remaining range of temperature, down to normal, without specific control.

Referring to the accompanying drawing, 1 represents the heating element and 2 the cooling element. The heating element is connected to deliver to the cooling element through a pipe 3, the milk being delivered to the heating element through the pipe 4 by means of a pump 5, which is shown herein in conventional form. The tank 6 represents the supply of milk and is connected to the pump through the pipe 7. The treated milk is delivered through the pipe 8 to a delivery receptacle 9, which has a draw-off faucet 10 controlled by a suitable valve, as 11.

The pipe 8 is preferably provided with a pressure regulator 12, so that the desired pressure may be maintained on the milk as it is forced through the heating and cooling elements by means of the pump. A steam pump is preferably used, as it is desirable ordinarily to maintain high pressure, and to force the milk rapidly through the heating and cooling elements.

The heating element 1 preferably consists of a cylindrical jacket 13, a pipe of about four inches diameter being found practical. The pipe is provided with heads or caps 14 and 15. Steam is admitted to the jacket by the pipe 16 connected to the head 15 and is discharged through the pipe 17 connected to the head 14. The supply pipe 4 is connected to the inlet end of the coil arranged within the jacket. Steam is supplied from a suitable source, so that it may be delivered under high pressure to secure the desired temperatures.

The heads 14 and 15 are provided with plug-like end pieces 18 and 19, respectively, which are adapted to receive the ends of a plurality of tubes forming the coil, the structure illustrated having 5 tubes as 20, 21, 22, 23 and 24. See Figs. 2, 4 and 5. These tubes are preferably of copper about $\frac{5}{16}$ of an inch internal diameter and about ten feet long. They are preferably open at each end for convenience in cleaning. These tubes are connected to form a single continuous channel. The connections in the structure illustrated are the headers 25 and 26, which are removably clamped against the outer faces of the pieces 18 and 19, respectively, screw bolts, as 27, being provided in the structure illustrated for the purpose. These headers are provided with channel-like passages 28, the ends of which register with the pipes to be connected. At the left hand end of Fig. 2 the channels are shown in cross section, they are also indicated by dotted lines in Fig. 4. The channels at the right hand end of the heating element are shown by dotted lines in Fig. 5. The pipes are thus connected so that the milk passes from the intake pipe 20, which is connected to the milk supply pipe 4, by a coupling 29, to the outlet pipe 23 of the heating element which is connected by the pipe 3 to the cooling element.

A thermometer 31 is provided for the heating element, it being preferably mounted on the pipe 3.

The cooling element preferably consists of a cylindrical jacket 32, having heads or caps 33 and 34, respectively. Within the jacket is a plurality of conduits or pipes 35. These pipes are supported by and extend through the end pieces 36 of the heads and open into the chambers 37 in the headers 38 and 39, the header 38 being at the inlet end and the header 39 being at the discharge end. The pipe 3 is connected to deliver to the header 38, while the header 39 is connected to the discharge pipe 8. Couplings 30 are preferably provided for the pipe 3 adapted to be readily removed.

A thermometer 40 is preferably arranged at the discharge end of the cooling element.

The headers are preferably removably secured, so that the pipes of the cooling element can be readily cleaned. These pipes are also formed of copper and are of about the same diameter as the pipes forming the coil of the heating element. In the structure illustrated, this is accomplished by providing the heads with flanges 41 and the headers with end plates 42, the parts being clamped together by the bolts 43.

The cooling fluid is delivered to the jacket by means of the pipe 44 and is discharged therefrom through the pipe 45.

The reservoir 9 is provided with a vent 46 which is screened by a mass of cotton or other suitable material. This reservoir is also provided with a steam inlet 47, by which the water and steam may be introduced for cleaning and sterilizing the reservoir.

With the parts thus arranged, the milk to be treated is delivered from the supply 6 by means of the pump, first to the heating element, then to the cooling element and then to the delivery tank.

The pump is, as stated, adapted to deliver the milk under high pressure, so that it is rapidly forced through the heating and cooling elements and also, it is desirable to maintain the pressure while the milk is being treated, in order to secure the most satisfactory product.

It will be noted that the heating element exposes the milk to the heat in a relatively small or attenuated body or stream. The cooling element also exposes the milk in a small or attenuated body or stream, the difference being that there is preferably a continuous single passage for the milk in the heating element and a plurality of passages in the cooling element. This causes the milk to flow more rapidly while being heated than while being cooled. This rapid movement of the milk through the heating element keeps it properly agitated so that it is evenly heated and prevents its burning. The presentation of the milk to the heat in the attenuated body or stream makes it possible to accomplish the desired heating rapidly.

In treating milk by my improved process, the heating and cooling elements are brought to the proper temperatures and the milk forced therethrough by means of the pump. Sweet milk, preferably as fresh as possible, is introduced at its normal temperature, for instance, about 20° centigrade, that is, no preliminary heating or cooling is required. The milk is forced through the apparatus, by means of the pump, under considerable pressure, preferably of about 600 pounds per square inch, which however, may be materially varied, and at such a rate that the time of passage through the heating element shall be preferably about two seconds, and that preferably the time of passage through the cooling element shall be similar.

The heating element is maintained at a temperature sufficient to raise the milk, in its passage through the same, to a temperature preferably of about 138° centigrade at the time of its exit therefrom. The temperature, to which the milk is ultimately thus raised, may vary within certain limits, but should not be substantially less than 130° centigrade, nor substantially more than 155° centigrade. The temperature of the steam in the heating element may, of course, be higher than the maximum limit above mentioned for the milk, depending upon the conductivity of the apparatus, the initial temperature of the milk, or other conditions.

Upon passing to the cooling element, the temperature of the milk is reduced to a point not substantially exceeding its boiling point and preferably about 98° centigrade. This cooling action should preferably take place with a rapidity substantially equal to that of the heating. The milk, having been received in the reservoir 9, and the pressure having been reduced, is then inclosed, preferably as soon as possible, in vessels which have been sterilized by heat, and whose temperature should preferably correspond substantially with that of the milk at this stage, the vessels being filled as nearly full as possible and promptly sealed. The subsequent cooling of the milk down to a temperature of about 70° centigrade, is thereupon controlled in any convenient manner, so that a substantial period, preferably about fifteen minutes, shall be required for the drop from its temperature at the moment of exit from the cooling element, (say 98° centigrade) to 70° centigrade. This prolonged secondary cooling insures the destruction of injurious bacteria, including any which may have obtained access after the emergence of the milk from the primary cooling apparatus and during the bottling operation. After the expiration of the time required for the secondary cooling, the milk may be allowed to cool down to a normal temperature without specific control.

Milk when thus treated, is thoroughly sterilized without any substantial impairment of color or breaking of the cream line, and retains the flavor of new untreated milk.

I employ the term "bottling", as a convenient one to describe the inclosure of the milk in any suitable vessel, and it will therefore be understood that said term does not imply any limitation as to the character of the vessel.

I have specified above the preferred temperatures and periods which give the best results in my process, but it is proper to state that some variation therefrom is permissible; thus, the milk may be raised to a temperature between 130° and 155° centigrade, but these limits should not be exceeded in either direction. The period of actual maintenance of the milk at the maximum temperature should be momentary, preferably only the fraction of a second, although the actual passage through the heating and cooling elements, during which the temperature is raised and lowered is of course longer. Under no circumstances should the milk be maintained at a temperature above 130° centigrade, for more than two seconds. The primary cooling to about 98° centigrade should, as before stated, be very rapid, and should preferably correspond in duration with that of the heating, and the secondary cooling from about 98° centigrade to about 70° centigrade, while prolonged during a substantial period, in order to subject any new bacteria to destructive exposure to heat, should not be protracted substantially beyond thirty minutes.

I am aware that the sterilization of milk by the controlled application of heat, is not broadly new, and I am also aware that it has been proposed to sterilize fluids, including milk, by exposing them to a temperature considerably above the boiling point, as set forth in Letters Patent of the United States No. 786,819, dated April 11th, 1905. I, therefore, do not broadly claim the brief exposure of milk to high heat, for I have found by actual experience that such exposure must not only be definite but must be attended by the definite control of the subsequent cooling, in order to produce the desired result of sterilizing the milk without impairment of its qualities. The essence of my invention resides in the organization and successive steps of treatment both in regard to temperature and periods of duration whose limits are above set forth.

Having thus described my invention, what I claim as new and desire to secure by Letters Patent, is:

The hereinbefore described process for the sterilization of milk, which consists in the heating of an attenuated body of milk to a temperature not substantially less than 130° centigrade or substantially more than 155° centigrade, during a period not substantially exceeding two seconds; the primary rapid cooling of the milk to a temperature of about 98° centigrade; the bottling and sealing of the milk; and the prolonged secondary cooling of the milk to a temperature of about 70° centigrade.

In witness whereof, I have hereunto set my hand and seal in the presence of two witnesses.

THEODORE G. MOLLINGER. [L. S.]

Witnesses:
M. PHINA WOODRUFF,
CLARA E. BRADEN.